(12) United States Patent
Frederick et al.

(10) Patent No.: US 10,071,775 B1
(45) Date of Patent: Sep. 11, 2018

(54) CARGO BED SIDE TOP EXTENDER

(71) Applicant: Toyota Motor Engineering & Manufacturing North America, Inc., Erlanger, KY (US)

(72) Inventors: Scott L. Frederick, Brighton, MI (US); Scott P. Robison, Dexter, MI (US); Adam D. Holmstrom, Pinckney, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/498,537

(22) Filed: Apr. 27, 2017

(51) Int. Cl.
*B62D 33/023* (2006.01)
*B60N 2/30* (2006.01)
*B60N 2/36* (2006.01)

(52) U.S. Cl.
CPC ......... *B62D 33/023* (2013.01); *B60N 2/3095* (2013.01); *B60N 2/36* (2013.01)

(58) Field of Classification Search
CPC ...... B62D 33/023; B60N 2/3095; B60N 2/38; B60N 2/36
USPC ............... 296/39.2, 41, 43, 39.1, 63, 67, 69; 297/250.1, 452.39
See application file for complete search history.

(56) References Cited

U.S. PATENT DOCUMENTS

| | | | |
|---|---|---|---|
| 4,997,227 A * | 3/1991 | Falzone | B60J 11/06 150/166 |
| 5,154,478 A | 10/1992 | Erickson et al. | |
| 5,636,883 A * | 6/1997 | Johns | B60J 11/06 150/166 |
| 5,704,678 A | 1/1998 | Elwell et al. | |
| 6,116,676 A * | 9/2000 | Edwards | B60N 2/3011 296/64 |
| 6,286,884 B1 * | 9/2001 | Speece | B60R 13/01 280/770 |
| 6,302,465 B1 * | 10/2001 | Faber | B60P 1/003 296/39.1 |
| 6,663,156 B1 * | 12/2003 | Kincaid | B60R 5/04 296/37.14 |
| 8,505,998 B1 * | 8/2013 | Weller | B62D 25/2054 296/39.2 |

(Continued)

OTHER PUBLICATIONS

Marine Tables "Tabletop Hinge", Retrieved from the Internet: <http://marinetablesinc.com/tabletop-hinge>, Retrieved Feb. 9, 2017, 1 page.

(Continued)

*Primary Examiner* — Gregory A Blankenship
(74) *Attorney, Agent, or Firm* — Christopher G. Darrow; Darrow Mustafa PC

(57) ABSTRACT

A covering for a wall of a vehicle cargo bed includes a first portion structured to be attached to a top portion of the wall, and a second portion rotatably connected to the first portion. The first portion has a first surface, and the second portion has a first surface. The second portion is rotatable between a first orientation in which the second portion first surface resides directly opposite the first portion first surface and faces in a first direction toward the first portion first surface, and a second orientation in which the second portion first surface faces in a second direction opposite the first direction. A shoulder extends from an edge of the second portion at an angle with respect to the second portion first surface.

18 Claims, 7 Drawing Sheets

(56) References Cited

U.S. PATENT DOCUMENTS

| | | | | |
|---|---|---|---|---|
| 9,701,225 | B1* | 7/2017 | Hogan | B60N 2/3095 |
| 2003/0085584 | A1* | 5/2003 | Golden | B60R 13/01 |
| | | | | 296/39.2 |
| 2004/0212209 | A1* | 10/2004 | Vitoorapakorn | B60R 13/01 |
| | | | | 296/39.2 |
| 2007/0296240 | A1* | 12/2007 | Geise | B60P 3/341 |
| | | | | 296/100.06 |
| 2009/0008960 | A1* | 1/2009 | Smith | B60P 3/341 |
| | | | | 296/164 |
| 2010/0308617 | A1* | 12/2010 | Golden | B60J 7/041 |
| | | | | 296/39.2 |
| 2012/0068493 | A1* | 3/2012 | Waterman | B60R 13/01 |
| | | | | 296/39.2 |
| 2012/0261938 | A1* | 10/2012 | Roach | B60P 7/0892 |
| | | | | 296/39.2 |
| 2017/0144520 | A1* | 5/2017 | Hemphill | B60R 13/01 |

OTHER PUBLICATIONS

Marine Tables "BiFold Hinged Leaf Teak Table", Retrieved from the Internet: <http://mrinetablesinc.com/bifold-hinged-leaf-table>, Retrieved on Feb. 9, 2017, 1 page.

* cited by examiner

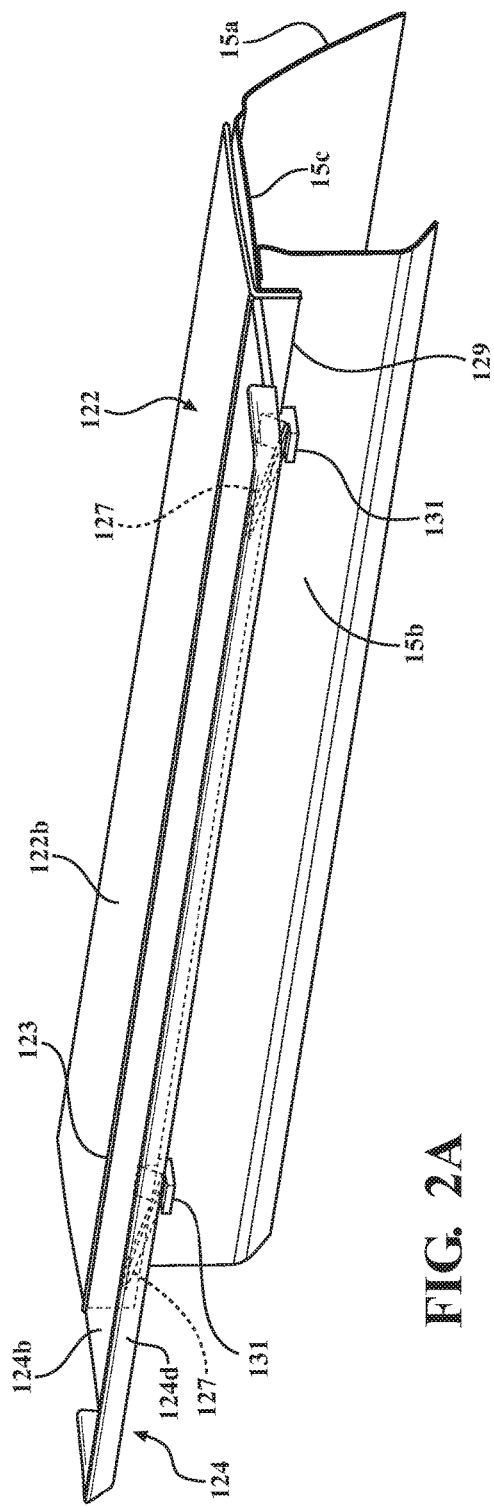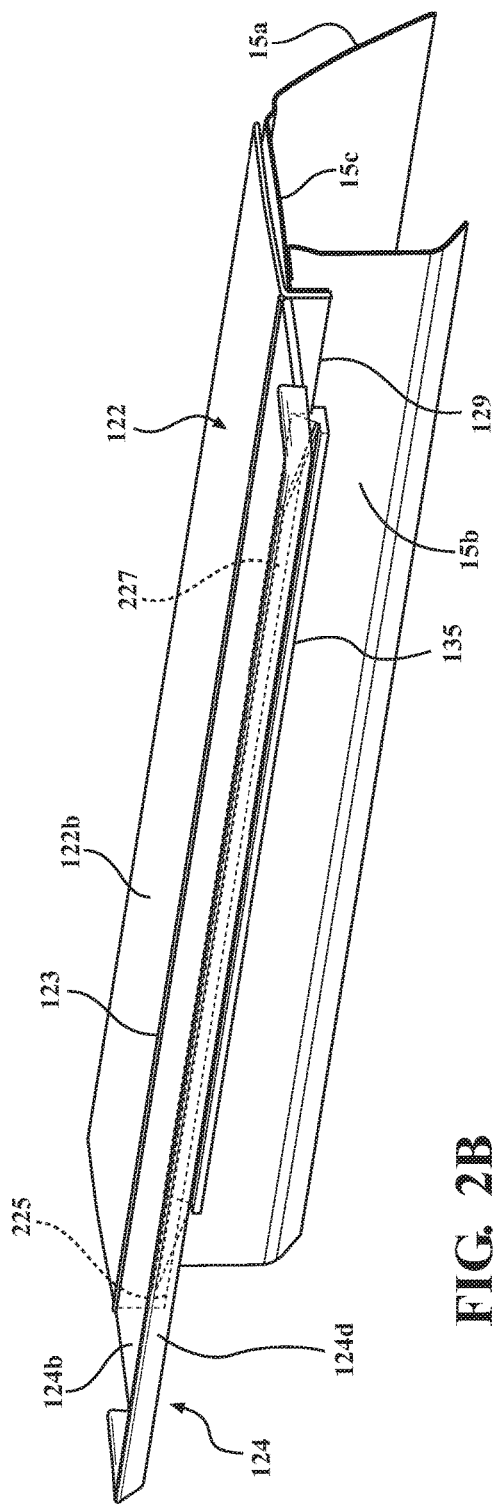
FIG. 2A
FIG. 2B

US 10,071,775 B1

CARGO BED SIDE TOP EXTENDER

TECHNICAL FIELD

The present invention relates to protective coverings which may be attached to top portions of a sidewall or tailgate defining a vehicle cargo bed.

BACKGROUND

Owners of vehicles (for example, pickup trucks) having cargo beds may use their vehicles for recreational purposes (such as camping or picnics), for construction or renovation projects, or for a variety of other purposes. Such activities may involve a user standing and working outside the cargo bed. Such activities may involve items such as multiple tools and other implements or devices. Locations for positioning items not currently being used may be limited to the ground or the cargo bed. Storing items in the cargo bed may require the user to constantly reach into the cargo bed. However, depending on the position and orientation of the vehicle with respect to the user and the contents of the cargo bed, it may be inconvenient for the user to constantly reach into the cargo bed.

SUMMARY

In one aspect of the embodiments described herein, a covering for a wall of a vehicle cargo bed is provided. The covering includes a first portion structured to be attached to a top portion of the wall. The first portion has a first surface. The covering also includes a second portion rotatably connected to the first portion. The second portion also has a first surface. The second portion is rotatable between a first orientation in which the second portion first surface resides directly opposite the first portion first surface and faces in a first direction toward the first portion first surface, and a second orientation in which the second portion first surface faces in a second direction opposite the first direction. A shoulder extends from an edge of the second portion at an angle with respect to the second portion first surface.

In another aspect of the embodiments described herein, a foldable seat structure for a vehicle is provided. The foldable seat structure includes a first portion structured for mounting to a wall defining a portion of a cargo bed of the vehicle. The first portion defines a first portion first surface. The seat structure also includes a second portion rotatably connected to the first portion. The second portion defines a second portion first surface. The second portion is rotatable between a first orientation in which the second portion first surface resides opposite and faces toward the first portion first surface, and a second orientation in which the second portion first surface is substantially coplanar with the first portion first surface. The first portion first surface and the second portion first surface are structured to form a seating surface when the first portion is mounted to the wall defining a portion of the cargo bed and the second portion is in the second orientation.

In another aspect of the embodiments described herein, a vehicle is provided including at least one wall defining a portion of a cargo bed, and a plurality of protective coverings mounted on a top portion of the at least one wall. Each covering of the plurality of coverings has a first portion mounted to the at least one wall, and a second portion rotatably connected to the first portion. A first covering of the plurality of coverings has a first structure, and a second covering of the plurality of coverings is mounted adjacent the first covering and has a second structure different from the first structure.

BRIEF DESCRIPTION OF THE DRAWINGS

FIG. 2A is a perspective view of one embodiment of a support structure configured to aid in supporting a second portion of the covering when the second portion is in a second orientation.

FIG. 2B is a perspective view of another embodiment of a support structure configured to aid in supporting the second portion of the covering when the second portion is in a second orientation.

DETAILED DESCRIPTION

Embodiments described herein relate to coverings for a wall of a vehicle (such as a pickup truck, for example) which defines a portion of a vehicle cargo bed. Each covering may include a first portion structured to be attached to a top portion of the wall, and a second portion rotatably connected to the first portion. The first and second portions may have respective first surfaces. The second portion is rotatable between a first orientation in which the second portion first surface resides directly opposite the first portion first surface and faces in a first direction toward the first portion first surface, and a second orientation in which the second portion first surface faces in a second direction opposite the first direction. When the second portion of the covering is in its second orientation, the first portion first surface and the second portion first surface are adjoining and substantially coplanar, and may combine to define a surface usable for the placement of objects thereon. This provides a storage surface at a height which is convenient and accessible for a user either inside the cargo bed or standing next to the vehicle. In certain embodiments, the storage surface may also be used as a seating surface by the user.

Figure 1:
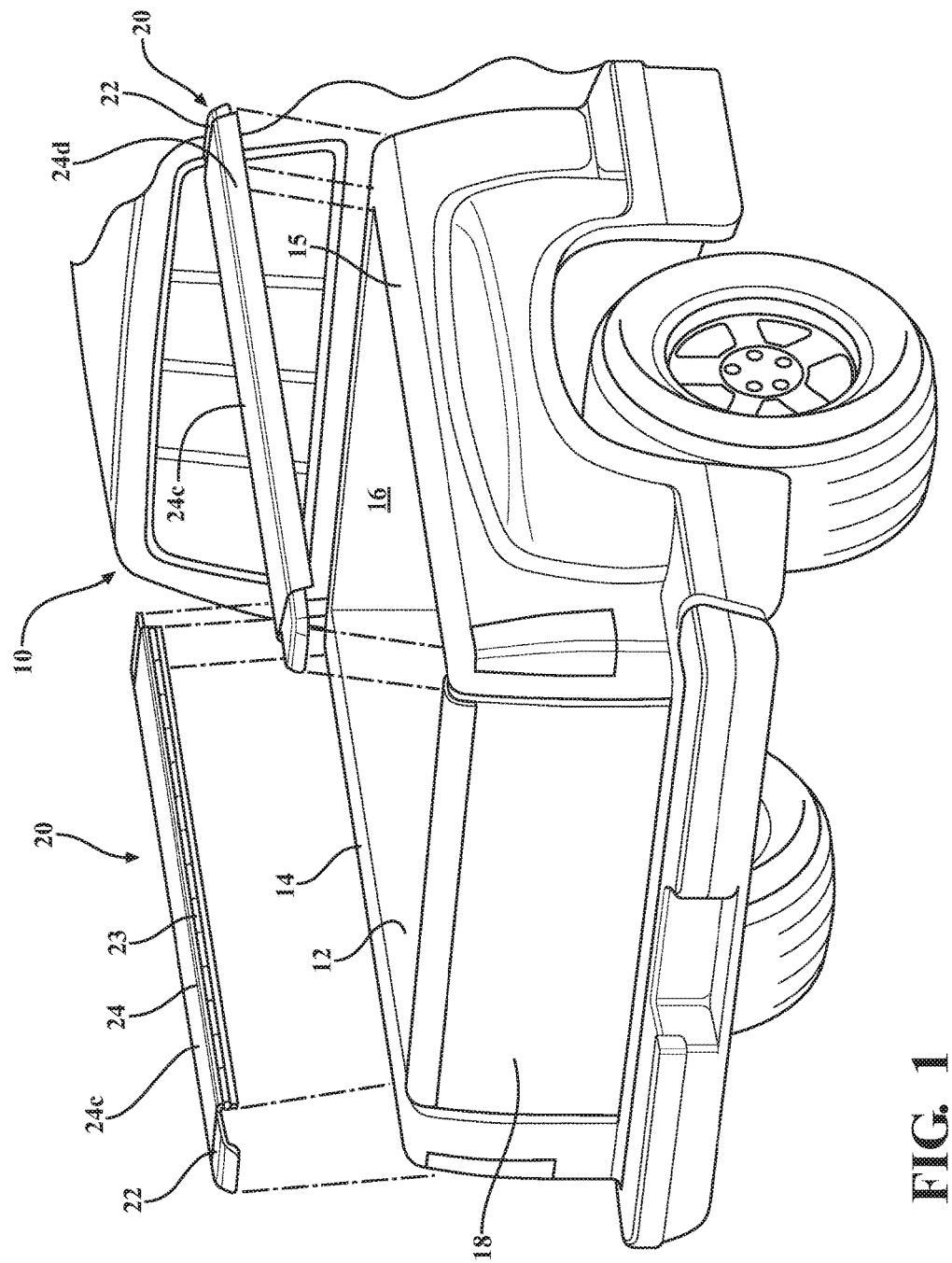
FIG. 1 is a schematic perspective view of a portion of a pickup truck including a protective covering in accordance an embodiment described herein attached to a top surface of each sidewall of the pickup truck cargo bed.
Figure 1A:
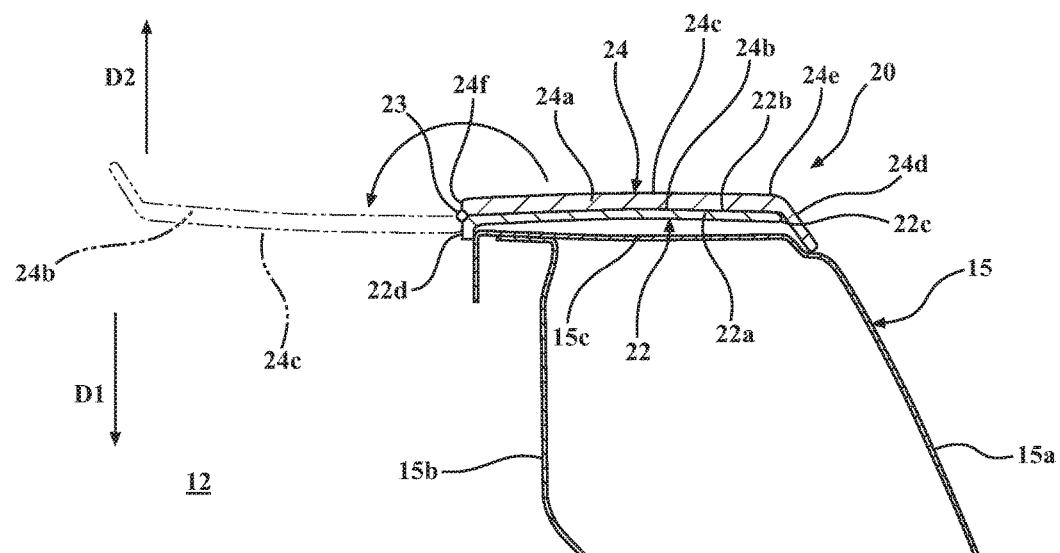
FIG. 1A is a schematic cross-sectional view of a covering in accordance with an embodiment described herein, attached to a top or uppermost surface of a sidewall of the cargo bed.

FIGS. 1-6 show various embodiments and possible features of a protective covering or cap for a top portion of a wall defining a portion of a vehicle cargo bed. With reference to the drawings, the vehicle (generally designated by the reference numeral 10) is in the form of a pickup truck, and includes a cargo bed 12 defined by a floor and a plurality of walls surrounding the floor, which may include left and right sidewalls 14 and 15, respectively, a front wall 16, and a tailgate 18. However, embodiments of the covering described herein may be mountable to cargo bed walls of vehicles other than pickup trucks. An embodiment of a covering as described herein may be mountable to a top or uppermost portion of any of the walls 14, 15, 16, and 18. The pickup truck 10 of FIG. 1 shows an embodiment of the protective covering as shown in FIG. 1A attached to sidewalls 14 and 15 of the truck. However, any of the covering embodiments described herein may be attached to at least any of the sidewalls 14, 15 and/or the tailgate 18.

FIG. 1A is a schematic cross-sectional view of an embodiment 20 of a covering attached to a top or uppermost surface 15c of a wall 15 of the cargo bed 12. In the example shown, the wall 15 is a sidewall of the bed. However, the covering embodiment 20 may alternatively be attached to any of the other walls 14, 16, or 18 shown in FIG. 1. The wall 15 also has an exterior surface 15a extending from a first edge of the top surface 15c along a portion of the vehicle exterior of the cargo bed 12, and an interior surface 15b extending from a second edge of the top surface 15c opposite the first edge. The interior surface 15b extends along the interior of the cargo bed 12.

Figure 2:
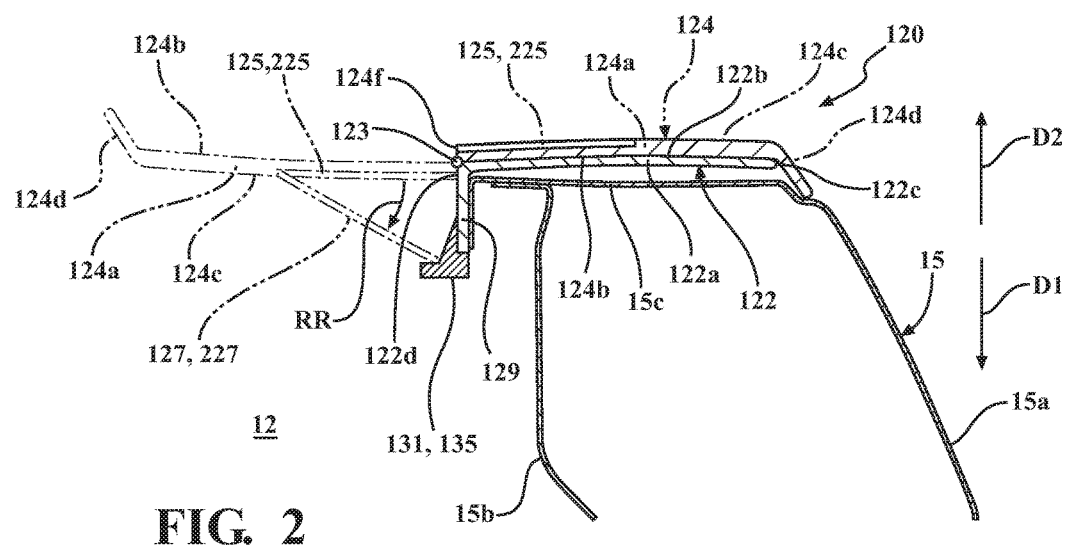
FIG. 2 is a schematic cross-sectional view of a covering in accordance with another embodiment described herein, attached to a top or uppermost surface of a sidewall of the cargo bed.
Figure 3:
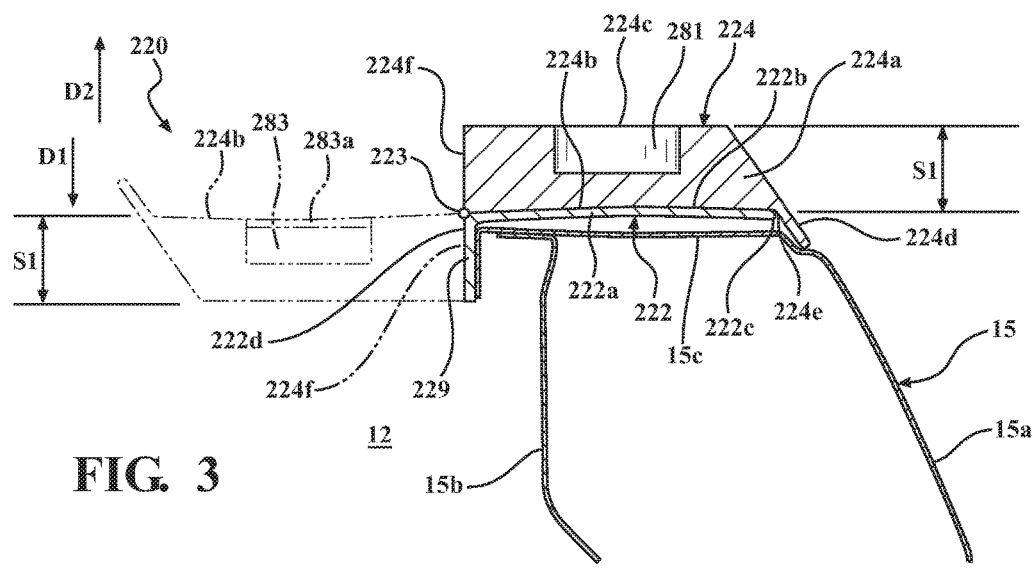
FIG. 3 is a schematic cross-sectional view of a covering in accordance with another embodiment described herein, attached to a top or uppermost surface of a sidewall of the cargo bed.

Referring to FIG. 1A, the covering 20 may include a first portion 22 having a body 22a structured to be attached to the top surface 15c of the wall 15. The first portion body 22a may have a first surface 22b. The first portion body 22a may be attached to the wall 15 using any suitable method, for example, adhesives or mechanical fasteners. The covering 20 may also include a second portion 24 rotatably connected to the first portion 22 at one or more rotatable connections 23. The second portion 24 may have a body 24a including a first surface 24b along one side thereof and a second surface 24c along an opposite side thereof. In one or more arrangements, the second portion first surface 24b is flat, to facilitate the placement of objects thereon according to the needs of a user. A shoulder 24d may extend from a first edge 24e of the second portion 24 at an angle with respect to the second portion first surface 24b. Shoulder 24d may be structured to cover a first edge 22c of the first portion body 22a, as well as a portion of the top surface 15c of the wall 15. If desired, an outer surface of shoulder 24d may be shaped to closely follow a contour of exterior wall surface 15a, as seen in FIGS. 1-3.

In one or more arrangements, and as seen in FIG. 1A, the second portion shoulder 24d may form an obtuse angle with the second portion first surface 24b. However, the shoulder 24d may extend from the second portion 24 so as to form a right angle with the second portion first surface 24b, or may extend from the second portion first surface 24b at any other desired angle.

The second portion 24 may have a first orientation (shown in solid lines in FIG. 1A) in which the second portion first surface 24b resides directly opposite the first portion first surface 22b and faces in a first direction D1, toward the first portion first surface 22b. A clip, pin, detent, or other securement mechanism (not shown) may be applied to the second portion 24 and/or the first portion 22 if needed, to secure the second portion 24 in the first orientation.

The second portion 24 may also have a second orientation (shown in phantom lines in FIG. 1A) in which the second portion first surface 24b adjoins or resides adjacent the first portion first surface 22b and faces in a second direction D2 opposite the first direction D1. In the embodiment shown in FIG. 1A, when the covering 20 is attached to the wall 15 of the vehicle 10, the direction D1 may be a downward direction while the direction D2 is an upward direction with respect to the vehicle 10. The second portion 24 may be rotatable between the first and second orientations. An edge 22d of the first portion 22 and an edge 24f of the second portion may be structured to abut each other when the second portion 24 is in the second orientation, to help support and maintain the second portion 24 in the second orientation.

In one or more arrangements, the direction D2 may be an upward direction, the first portion first surface 22b may be structured to face in the direction D2 when the first portion 22 is attached to the wall top surface 15c, and the second portion first surface 24b may be structured to face in the direction D2 when the second portion 24 is in the second orientation. As seen in FIG. 1A, shoulder 24d may be structured to extend from second portion body 24a in an upward direction D2 when the first portion body 22a is attached to the wall 15 and the second portion 24 is in the second orientation.

Rotatable connections between the first and second portions of the covering embodiments described herein may be in any form suitable for the purposes described herein. In one or more arrangements, for example, a hinge utilizing one or more hinge pins such as metal pin(s) may be used. Elements of the embodiments of the covering described herein may be formed from any suitable material or materials. For example, elements of the covering may be molded from suitable polymers and/or metallic materials.

In any of the covering embodiments described herein, the second portion first surface may be flat, the first portion first surface may be flat, and the first portion first surface and second portion first surface may be structured to be substantially coplanar when the second portion is in the second orientation. Examples of such embodiments are shown in FIGS. 4A-4C and 5. In one or more arrangements, first portion first surfaces and second portion first surfaces specified herein as being coplanar or substantially coplanar may be coplanar within a tolerance zone of 0.10 inches.

Alternatively, in any of the covering embodiments described herein, the second portion first surface may be concave with respect to the first portion first surface when the second portion first surface faces the first portion first surface (i.e., when the second portion is in the first orientation). In addition, the first portion first surface may be convex with respect to the second portion first surface when the second portion is in the first orientation. Examples of such embodiments are shown in FIGS. 1A, 2-2B, and 3. In FIG. 1A, for example, the second portion first surface 24b may be concave with respect to the first portion first surface 22*b* when the second portion first surface 24*b* faces the first portion first surface 22*b*. In addition, the first portion first surface 22*b* may be convex with respect to the second portion first surface 24*b* when the second portion is in the first orientation. This configuration may effectively form a "well" or depression along second portion first surface 24*b* between the shoulder 24*d* and the first portion first surface 22*b* in which objects may be placed and retained, when the second portion 24 is in the second orientation.

FIG. 2 is a schematic cross-sectional view of another embodiment 120 of a covering attached to the top or uppermost surface 15*c* of sidewall 15 of the cargo bed 12. FIG. 2A is a perspective view of the covering embodiment shown in FIG. 2. The covering embodiment 120 may alternatively be attached to any of the other walls 14, 16, or 18 shown in FIG. 1. The structure of the embodiment 120 is generally similar to the embodiment shown in FIG. 1A.

Referring to FIG. 2, the covering 120 may include a first portion 122 having a body 122*a* structured to be attached to the top surface 15*c* of the wall 15. The first portion body 122*a* may have a first surface 122*b*. The first portion body 122*a* may be attached to the wall 15 using any suitable method, for example, adhesives or mechanical fasteners. In addition, a shoulder 129 may extend from a first edge 122*d* of first portion body 122*a*. Shoulder 129 may cover and/or rest against an associated portion of the wall 15 as shown. The shoulder 129 may extend from the first portion body 122*a* so as to form a right angle with the first portion first surface 122*b*, or the shoulder 129 may extend from the first portion body 122*a* at any other desired angle.

The covering 120 may also include a second portion 124 rotatably connected to the first portion 122 at one or more rotatable connections 123. The second portion 124 may have a body 124*a* including a first surface 124*b* along one side thereof and a second surface 124*c* along an opposite side thereof. In one or more arrangements, the second portion second surface 124*c* is flat, to facilitate the placement of objects thereon according to the needs of a user.

The second portion 124 may have a first orientation (shown in solid lines in FIG. 2) in which the second portion first surface 124*b* resides directly opposite the first portion first surface 122*b* and faces in a first direction D1, toward the first portion first surface 122*b*. A clip, pin, detent, or other securement mechanism (not shown) may be applied to the second portion 124 and/or the first portion 122 if needed, to secure the second portion 124 in the first orientation.

The second portion 124 may also have a second orientation (shown in phantom lines in FIG. 2) in which the second portion first surface 124*b* adjoins or resides adjacent the first portion first surface and faces in a second direction D2 opposite the first direction D1. In the embodiment shown in FIG. 2, when the covering 120 is attached to the wall 15 of the vehicle 10, the direction D1 may be a downward direction while the direction D2 is an upward direction with respect to the vehicle 10. The second portion 124 may be rotatable between the first and second orientations.

The covering may also include a support structure designed to aid in supporting the second portion 124 when the second portion is in the second orientation. FIG. 2A is a schematic perspective view of one embodiment of the support structure. In one embodiment, the support structure may include one or more supports 131 formed with (or attached to) shoulder 129. Each of support(s) 131 may be structured to provide one or more bearing surfaces usable for engaging an associated deployable support arm 127 mounted on covering second portion 124, to support the arm when the arm is in a deployed condition.

In addition, one or more cavities 125 may be formed in second portion second surface 124*c*. The support structure may also include an associated support arm 127 rotatably mounted in each of cavities 125. Each of support arm(s) 127 may be rotatably connected to second portion 124 and may be rotatably deployable in the direction of arrow RR from an associated cavity 125 to engage the bearing surfaces formed on an associated one of supports 131 as shown in FIG. 2. When the support arms 127 are deployed and engage the supports 131, the support arms 127 aid in supporting the covering second portion 124 when the second portion is in the second orientation. This may enable relatively heavier loads to be supported by the second portion 124 in the second orientation.

A shoulder 124*d* may extend from a first edge of the second portion 124 at an angle with respect to the second portion first surface 124*b*. Shoulder 124*d* may be structured to cover a first edge 122*c* of the first portion body 122*a*, as well as a portion of the top surface 15*c* of the wall 15, as previously described. If desired, an outer surface of shoulder 124*d* may be shaped to closely follow a contour of exterior wall surface 15*a*, as seen in FIGS. 1-3. In one or more arrangements, and as seen in FIG. 2, the second portion shoulder 124*d* may form an obtuse angle with the second portion first surface 124*b*. However, the shoulder 124*d* may extend with respect to the second portion first surface 124*b* so as to form a right angle with the second portion first surface 124*b*, or may extend with respect to the second portion first surface 124*b* at any other desired angle. A second edge 122*d* of the first portion 122 and a second edge 124*f* of the second portion may be structured to abut when the second portion 124 is in the second orientation, to support and maintain the second portion 124 in the second orientation.

In one or more arrangements, the direction D2 may be an upward direction, the first portion first surface 122*b* may be structured to face in the direction D2 when the first portion 122 is attached to the wall top surface 15*c*, and the second portion first surface 124*b* may be structured to face in the direction D2 when the second portion 124 is in the second orientation. As seen in FIG. 2, shoulder 124*d* may be structured to extend from second portion body 124*a* in an upward direction D2 when the first portion body 122*a* is attached to the wall 15 and the second portion 124 is in the second orientation.

FIG. 2B is a perspective view of an alternative embodiment of the support structure. In this embodiment, a single, extended-length support 135 having a structure similar to supports 131 of FIG. 2A may extend along a portion of a length of first portion shoulder 129. In addition, a single longitudinal support wall 227 may be rotatably mounted in an associated longitudinal cavity 225 formed in second portion 124. Wall 227 may be deployable to engage bearing surfaces formed by the support 135 in the manner previously described with respect to FIG. 2A.

FIG. 3 is a schematic cross-sectional view of another embodiment 220 of a covering attached to the top or uppermost surface 15*c* of sidewall 15 of the cargo bed 12. The covering embodiment 220 may alternatively be attached to any of the other walls 14, 16, or 18 shown in FIG. 1.

Referring to FIG. 3, the covering 220 may include a first portion 222 having a body 222*a* structured to be attached to the top surface 15*c* of the wall 15. The first portion body 222*a* may have a first surface 222*b*. The first portion body 222*a* may be attached to the wall 15 using any suitable method, for example, adhesives or mechanical fasteners. In addition, a shoulder 229 may extend from an edge 222*d* of first portion body 222a. Shoulder 229 may cover and/or rest against an associated portion of the wall 15 as shown. The shoulder 229 may extend from the first portion body 222a so as to form a right angle with the first portion first surface 222b, or the shoulder 229 may extend from the first portion body 222a at any other desired angle.

The covering 220 may also include a second portion 224 rotatably connected to the first portion 222 at one or more rotatable connections 223. The second portion 224 may have a body 224a including a first surface 224b along one side thereof and a second surface 224c along an opposite side thereof. In one or more arrangements, the second portion second surface 224c is flat, to facilitate the placement of objects thereon according to the needs of a user.

Second portion 224 may also be structured to have a relatively greater depth dimension 51 than second portions 24 and 124 in the previously described embodiments. This increases the bearing area of edge 224f available to abut first portion shoulder 229, which may increase the load-bearing capacity of the second portion first surface 224b when the second portion 224 is in the second orientation (shown in phantom in FIG. 3). In addition, the increased depth or thickness 51 of the second portion 224 may enable cavities to be formed in the second portion for various purposes. For example, one or more open cavities 281 may be formed in second portion second surface 224c. Cavities 281 may be structured as, for example, beverage holders, storage compartments, or for any other desired purpose.

Also, one or more cavities 283 may be formed in second portion first surface 224b. One or more of the cavities 283 may be closable using an associated lid 283a which may be attached to the second portion 224 using a hinge, for example. Such closable cavities may also be formed in second portion second surface 224c. Cavities 283 may be structured as, for example, beverage holders, storage compartments, or for any other desired purpose.

A shoulder 224d may extend from a first edge 224e of the second portion 224 at an angle with respect to the second portion first surface 224b. Shoulder 224d may be structured to cover a first edge 222c of the first portion body 222a, as well as a portion of the top surface 15c of the wall 15, as previously described. If desired, an outer surface of shoulder 224d may be shaped to closely follow a contour of exterior wall surface 15a, as seen in FIGS. 1-3. In one or more arrangements, and as seen in FIG. 3, the second portion shoulder 224d may form an obtuse angle with the second portion first surface 224b. However, the shoulder 224d may extend from the second portion first surface 224b so as to form a right angle with the second portion first surface 224b, or may extend from the second portion first surface 224b at any other desired angle.

The second portion 224 may have a first orientation (shown in solid lines in FIG. 3) in which the second portion first surface 224b resides directly opposite the first portion first surface 222b and faces in first direction D1, toward the first portion first surface 222b. A clip, pin, detent, or other securement mechanism (not shown) may be applied to the second portion 224 and/or the first portion 222 if needed, to secure the second portion 224 in the first orientation.

The second portion 224 may also have a second orientation (shown in phantom lines in FIG. 3) in which the second portion first surface 224b adjoins the first portion first surface 222b and faces in a second direction D2 opposite the first direction D1. In the embodiment shown in FIG. 3, when the covering 220 is attached to the wall 15 of the vehicle 10, the direction D1 may be a downward direction while the direction D2 is an upward direction with respect to the vehicle 10. The second portion 224 may be rotatable between the first and second orientations. Shoulder 229 of the first portion 222 and an edge 224f of the second portion 224 may be structured to abut when the second portion 224 is in the second orientation, to support and maintain the second portion 224 in the second orientation.

In one or more arrangements, the direction D2 may be an upward direction, the first portion first surface 222b may be structured to face in the direction D2 when the first portion 222 is attached to the wall top surface 15c, and the second portion first surface 224b may be structured to face in the direction D2 when the second portion 224 is in the second orientation. As seen in FIG. 3, second portion shoulder 224d may be structured to extend from second portion body 224a in the upward direction D2 when the first portion body 222a is attached to the wall 15 and the second portion 224 is in the second orientation.

Figure 4A:
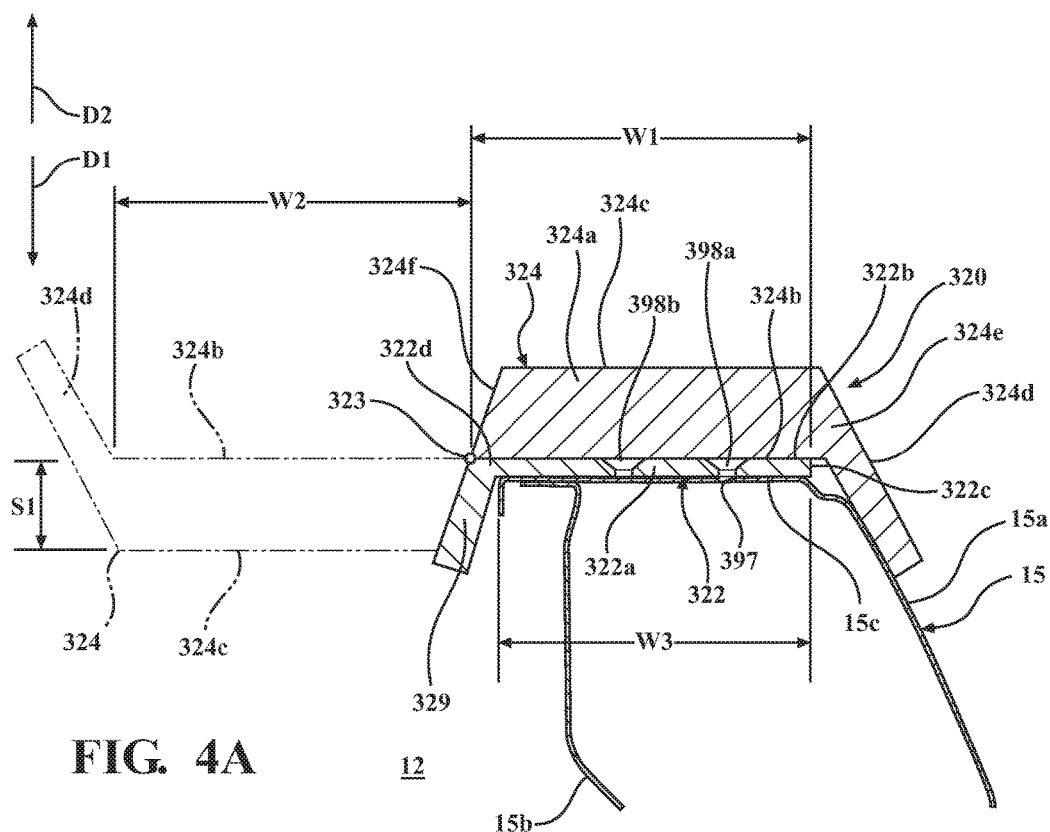
FIG. 4A is a schematic cross-sectional view of a covering in accordance with another embodiment described herein, attached to a top or uppermost surface of a sidewall of the cargo bed so that a second portion of the covering is rotatable from its first orientation in a direction toward the cargo bed to bring the second portion into its second orientation.
Figure 4B:
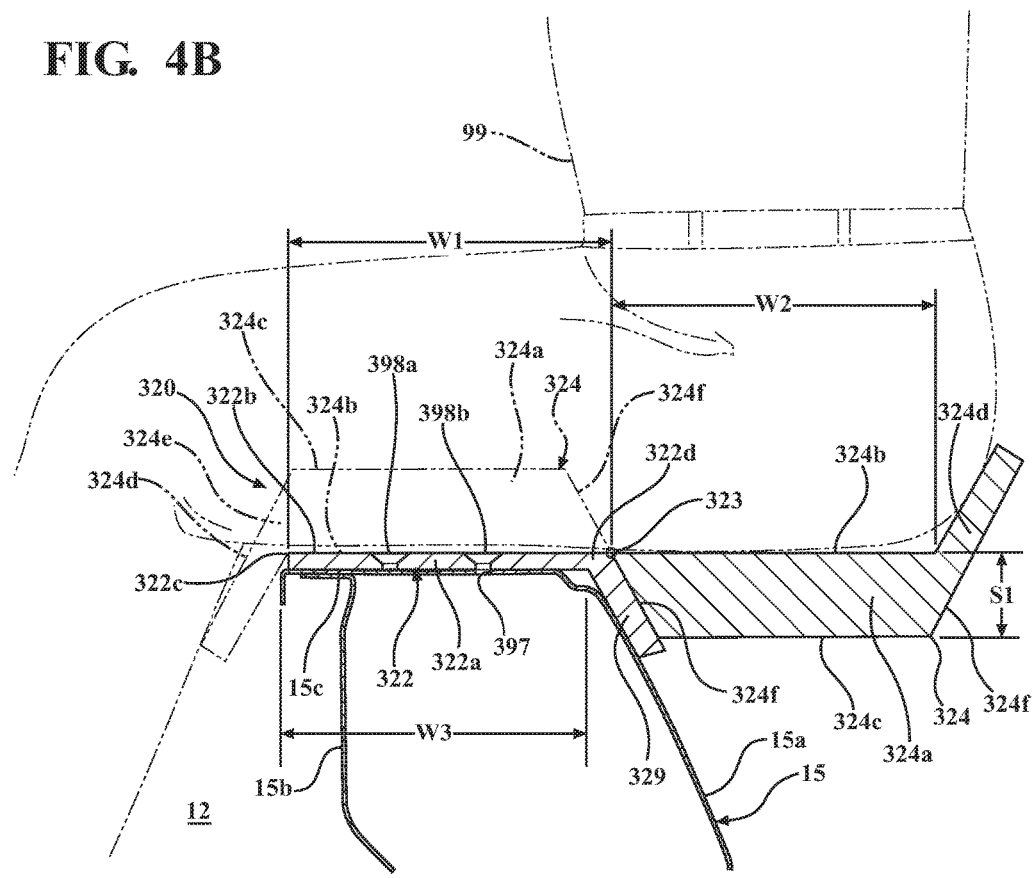
FIG. 4B is a schematic cross-sectional view of the covering embodiment shown in FIG. 4A, attached to a top or uppermost surface of a sidewall of the cargo bed so that the second portion of the covering is rotatable from its first orientation in a direction away from the cargo bed to bring the second portion into its second orientation.

FIGS. 4A-4B are schematic cross-sectional views of another embodiment 320 of a covering attached to the top or uppermost surface 15c of sidewall 15 of the cargo bed 12. The covering embodiment 320 may alternatively be attached to any of the other walls 14, 16, or 18 shown in FIG. 1. The structure of the embodiment 320 is generally similar to the embodiment shown in FIG. 3.

Referring to FIG. 4A, the covering 320 may include a first portion 322 having a body 322a structured to be attached to the top surface 15c of the wall 15. The first portion body 322a may have a first surface 322b. In one or more arrangements, the first portion first surface 322b is flat, to facilitate the placement of objects thereon according to the needs of a user. In addition, a shoulder 329 may extend from an edge 322d of first portion body 322a. Shoulder 329 may cover and/or rest against an associated portion of the wall 15.

The covering 320 may also include a second portion 324 rotatably connected to the first portion 322 at one or more rotatable connections 323. The second portion 324 may have a body 324a including a first surface 324b along one side thereof and a second surface 324c along an opposite side thereof. In one or more arrangements, the second portion second surface 324c is flat, to facilitate the placement of objects thereon according to the needs of a user.

As shown in FIG. 4A, the depth 51 of the second portion 324 and the length of the first portion shoulder 329 may be controlled to optimize the bearing surface area between second portion edge 324f and shoulder 329, which may increase the load-bearing capacity of the second portion first surface 324b when the second portion 324 is in the second orientation. In addition, the depth or thickness 51 of the second portion 324 may enable cavities (not shown) to be formed in the second portion for various purposes, as previously described with respect to FIG. 3.

A shoulder 324d may extend from an edge 324e of the second portion 324 at an angle with respect to the second portion first surface 324b. Shoulder 324d may be structured to cover a first edge 322c of the first portion body 322a as well as a portion of the top surface 15c of the wall 15, as previously described. If desired, a surface of shoulder 324d may be shaped to closely follow a contour of exterior wall surface 15a, as seen in FIG. 4A. In one or more arrangements, and as seen in FIG. 4A, the second portion shoulder 324d may form an obtuse angle with the second portion first surface 324b. However, the shoulder 324d may extend so as to form a right angle with the second portion first surface 324b, or may extend so as to form any other desired angle with respect the second portion first surface 324b.

In one operational mode, the covering 320 may be attached to the wall 15 so that the first portion shoulder 329 extends from the edge 322d toward an interior of the cargo bed as shown in FIG. 4A. In this mode, when the second portion 324 is in the second orientation (shown in phantom in FIG. 4A), the first portion first surface 322b and the adjoining second portion first surface 324b may form a combined surface usable for placement of objects thereon by a user standing next to the vehicle, for example.

The shoulder 329 may extend from the first portion body 322a so as to form an obtuse angle with the first portion first surface 322b. This angle may be specified so that the shoulder 329 will bear against an exterior surface 15a of wall 15 when the first portion 322 is attached to the wall 15 such that the first portion shoulder 329 extends from the edge 322d toward an exterior of the cargo bed as shown in FIG. 4B. The ability of first portion shoulder 329 to bear against the wall exterior surface 15a may aid the covering first portion 322 in supporting a load exerted on the covering second portion 324 by a seated occupant or user 99, as described herein. Alternatively, the shoulder 329 may extend from the first portion body 322a at any other desired angle. The first portion body 322a may be attached to the wall 15 using any suitable method, for example, adhesives or mechanical fasteners.

The second portion 324 may have a first orientation (shown in solid lines in FIG. 4A) in which the second portion first surface 324b resides directly opposite the first portion first surface 322b and faces in first direction D1, toward the first portion first surface 322b. A clip, pin, or other securement mechanism (not shown) may be applied to the second portion 324 and/or the first portion 322 if needed, to secure the second portion 324 in the first orientation.

The second portion 324 may also have a second orientation (shown in phantom in FIG. 4A) in which the second portion first surface 324b adjoins the first portion first surface 322b and faces in a second direction D2 opposite the first direction D1. In the embodiment shown in FIGS. 4A and 4B, when the covering 320 is attached to the wall 15 of the vehicle 10, the direction D1 may be a downward direction while the direction D2 is an upward direction with respect to the vehicle 10. The second portion 324 may be rotatable between the first and second orientations. Shoulder 329 of the first portion 322 and an edge 324f of the second portion may be structured to abut when the second portion 324 is in the second orientation, to support and maintain the second portion 324 in the second orientation.

In one or more arrangements, the direction D2 may be an upward direction, the first portion first surface 322b may be structured to face in the direction D2 when the first portion 322 is attached to the wall top surface 15c, and the second portion first surface 324b may be structured to face in the direction D2 when the second portion 324 is in the second orientation. As seen in FIGS. 4A and 4B, second portion shoulder 324d may be structured to extend from second portion body 324a in an upward direction D2 when the first portion body 322a is attached to the wall 15 and the second portion 324 is in the second orientation. In one or more embodiments, the second portion first surface 324b is flat, the first portion first surface 322b is flat, and the second portion first surface 324b is structured to be substantially coplanar with the first portion first surface 322b when the second portion is in the second orientation.

Referring to FIGS. 4A and 4B, the covering 320 may be structured to be reversibly attachable to the top surface of wall 15. In one operational mode, the covering 320 may be attached to the wall 15 so that the first portion shoulder 329 extends from the edge 322d toward an exterior of the cargo bed as shown in FIG. 4B. In this mode, the covering second portion 324 may be opened to the second orientation as shown to support an occupant 99 who will be seated on the first portion first surface 322a and second portion first surface 324b, and with the legs of the occupant positioned in the cargo bed.

In one or more arrangements, a series of holes 397 may be formed along a length of the wall 15 for attachment of the covering first portion 322 to the wall 15 using threaded fasteners. Also, a series of through holes 398 may be formed in the covering first portion 322 in longitudinal correspondence with holes 397 for use in attaching the covering first portion 322 to the wall 15 using threaded fasteners inserted into holes 397 and 398. A first portion 398a of the series of through holes may be arranged collinearly along a length of the first portion 322 (i.e., along a direction extending perpendicular to a plane of the drawings in FIGS. 4A and 4B) and positioned along a width dimension W3 of the first portion 322. The first portion 398a of the series of through holes may be structured for use in attaching the covering first portion 322 to the wall 15 via wall holes 397 so that the first portion shoulder 329 extends toward an interior of the cargo bed as shown in FIG. 4A. A second portion 398b of the series of through holes may be arranged collinearly along the length of the covering first portion 322 and spaced apart along the width dimension W3 from the first portion 398a of the through holes. The second portion 398b of the through holes may be structured for use in attaching the covering first portion 322 to the wall 15 via wall holes 397 so that the first portion shoulder 329 extends toward an exterior of the cargo bed, as shown in FIG. 4B.

In addition, width dimensions W1 of the first portion first surface 322b and W2 of the second portion first surface 324b may be varied to some degree, according to the desired size of the combined surface formed by surfaces 322b and 324b, the dimensions of the wall 15, and other pertinent factors. One portion of the first portion 398a of through holes and the second portion 398b of through holes may also be positioned along a width dimension W3 of the first portion 322 such that first portion shoulder 329 will bear or rest against the exterior surface 15a of wall 15 when the first portion shoulder 329 extends from the first portion body 322a toward an exterior of the cargo bed as shown in FIG. 4B, regardless of the widths W1 and W2 of the surfaces 322b and 324b. In this arrangement, surface 15a helps support shoulder 329 and covering second portion 324 when the covering supports a seated occupant thereon, as shown in FIG. 4B.

Figure 4C:
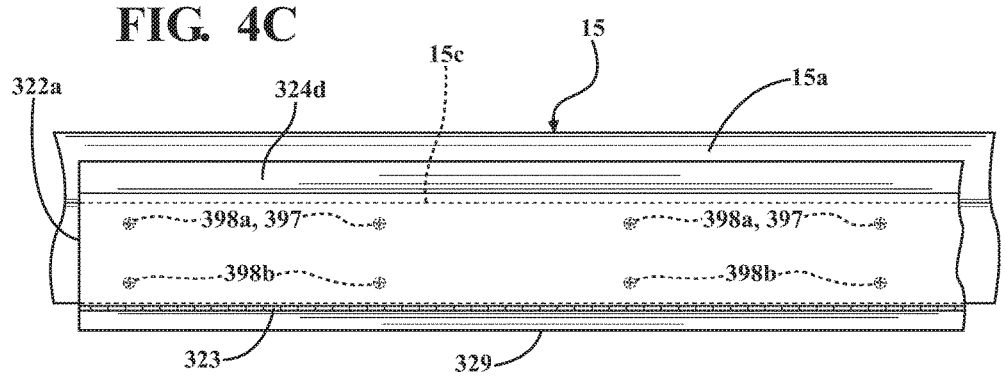
FIG. 4C is a schematic plan view showing a first portion of the covering of FIG. 4A positioned on the wall top surface, with through holes formed in the covering first portion aligned with corresponding ones of holes formed along the wall top surface.

FIG. 4C is a schematic plan view showing a portion of the covering first portion 322 of FIG. 4A positioned on the wall top surface 15c, with each hole of the first portion 398a of through holes aligned with an associated one of the holes 397 formed along wall top surface 15c. For example, in the embodiment shown in FIGS. 4A-4C, the first portion 398a of through holes may be used to attach the covering first portion 322 to the wall 15 when the covering is oriented so that the first portion shoulder 329 extends toward the interior of the cargo bed, as shown in FIG. 4A. In this mode of operation, the combined first surfaces 322b and 324b may be used as a surface on which object may be placed by a user positioned adjacent the wall 15. When the holes in covering first portion 322 are aligned with the holes 398a in the sidewall top surface 15c, the covering first portion may be secured to the sidewall 15 using threaded fasteners or any other suitable means.

The orientation of the covering 320 may also be reversed and the covering first portion 322 attached to the wall 15 using the second portion 398b of through holes, so that the first portion shoulder 329 extends toward the exterior of the cargo bed, as shown in FIG. 4B. In this mode of operation, the covering 320 may be used to provide a foldable seat structure for the vehicle. The combined first surfaces 322b and 324b may be used as a seating surface to support an occupant 99 whose legs may be inside the cargo bed. The provision of two sets 398a and 398b of attachment holes enables the covering first portion 322 to be attached to the sidewall top surface 15c so that either of the shoulders 329 and 324d (depending on the orientation of the covering) may bear against the exterior surface 15a when the covering is attached to the sidewall.

As seen in FIG. 4A, when the covering 320 is attached to the wall 15 such that shoulder 324d extends from the covering second portion 324a toward an exterior of the cargo bed when the second portion is in the first orientation, movement of the second portion 324 to the second orientation may provide a surface (formed by a combination of first portion first surface 322b and second portion first surface 324b) suitable for placement of objects thereon by a user (not shown) positioned adjacent the wall 15. Also, as seen in FIG. 4B, when the covering 320 is attached to the wall 15 such that shoulder 324d extends from the covering second portion 324a toward an interior of the cargo bed when the second portion is in the first orientation, movement of the second portion 324 to the second orientation may provide a surface (formed by a combination of first portion first surface 322b and second portion first surface 324b) suitable for placement of objects thereon by a user (not shown) positioned adjacent the wall 15. In this arrangement, however, the movement of the second portion 324 to the second orientation may also provide a surface (formed by a combination of first portion first surface 322b and second portion first surface 324b) suitable for use by an occupant 99 as a seating surface. In this operational mode, the upwardly-extending second portion shoulder 324d may serve as a boundary of the seating surface, which acts as a tactile "backstop" or warning mechanism for alerting a user when a rear end of the seating surface has been reached.

Figure 5:
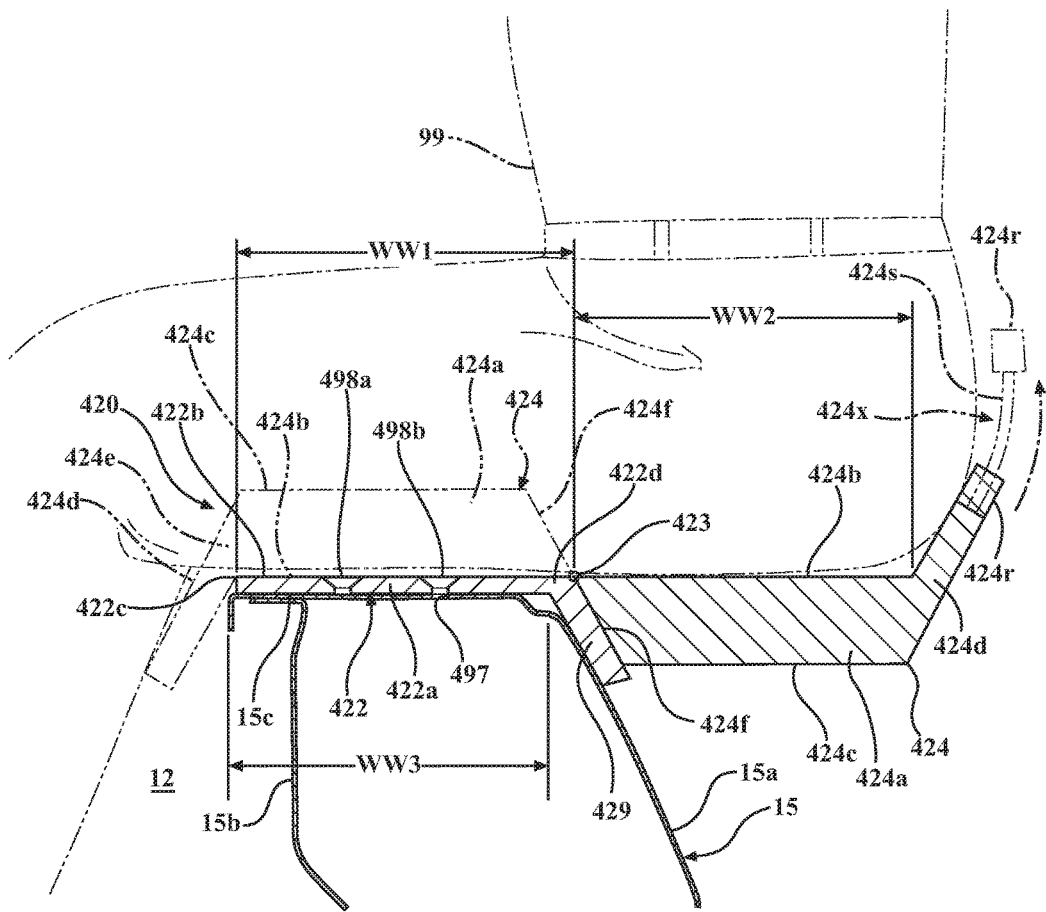
FIG. 5 is a schematic cross-sectional view of another embodiment of the covering similar in structure to the embodiment shown in FIGS. 4A and 4B.

FIG. 5 shows a variation 420 of the covering shown in FIGS. 4A-4C, which may be structurally and operationally largely identical to the embodiment 320 shown in FIGS. 4A-4C. For features common to both embodiments, reference numerals in FIG. 5 have been incremented by "100" over the reference numerals shown in FIGS. 4A-4C. In addition, dimension WW1 in FIG. 5 corresponds to dimension W1 in FIGS. 4A-4C, dimension WW2 in FIG. 5 corresponds to dimension W2 in FIGS. 4A-4C, and dimension WW3 in FIG. 5 corresponds to dimension W3 in FIGS. 4A-4C. The covering in FIG. 5 may be structurally and operationally identical to the embodiment 320 shown in FIGS. 4A-4C except as follows. In the covering 420 of FIG. 5, the second portion shoulder 424d formed on covering second portion 424 may include a retractable shoulder extension 424x extendibly mounted in the covering second portion shoulder. The shoulder extension 424x may include an extender 424s and a cap 424r attached to the end of the extender 424s. The extender 424s may be formed from a curved, rigid piece of polymer, metal, or any other suitable material. The extender 424s may be structured to be mounted in curved guides or tracks (not shown) formed in the covering second portion 424. The guides may optionally extend beyond the shoulder 424d and into a body 424a of the second portion 424.

The shoulder extension 424x may be movable between a stowed or retracted position (shown in FIG. 5 in solid lines) in which the extender 424s is positioned within the second portion shoulder 424d and body 424a, and an extended position (shown in phantom lines). When in the extended position, the shoulder extension 424x may also act as a tactile "backstop" extension or warning mechanism for alerting a user 99 when a rear end of the seating surface has been reached. The shoulder extension 424x may provide a relatively higher contact point for the seated occupant 99 than the end of shoulder 324d of FIGS. 4A-4B. Cap 424r may blend with and form an end portion of the second portion shoulder 424d as shown in FIG. 5 when the shoulder extension 424x is in the retracted position.

Figure 6:
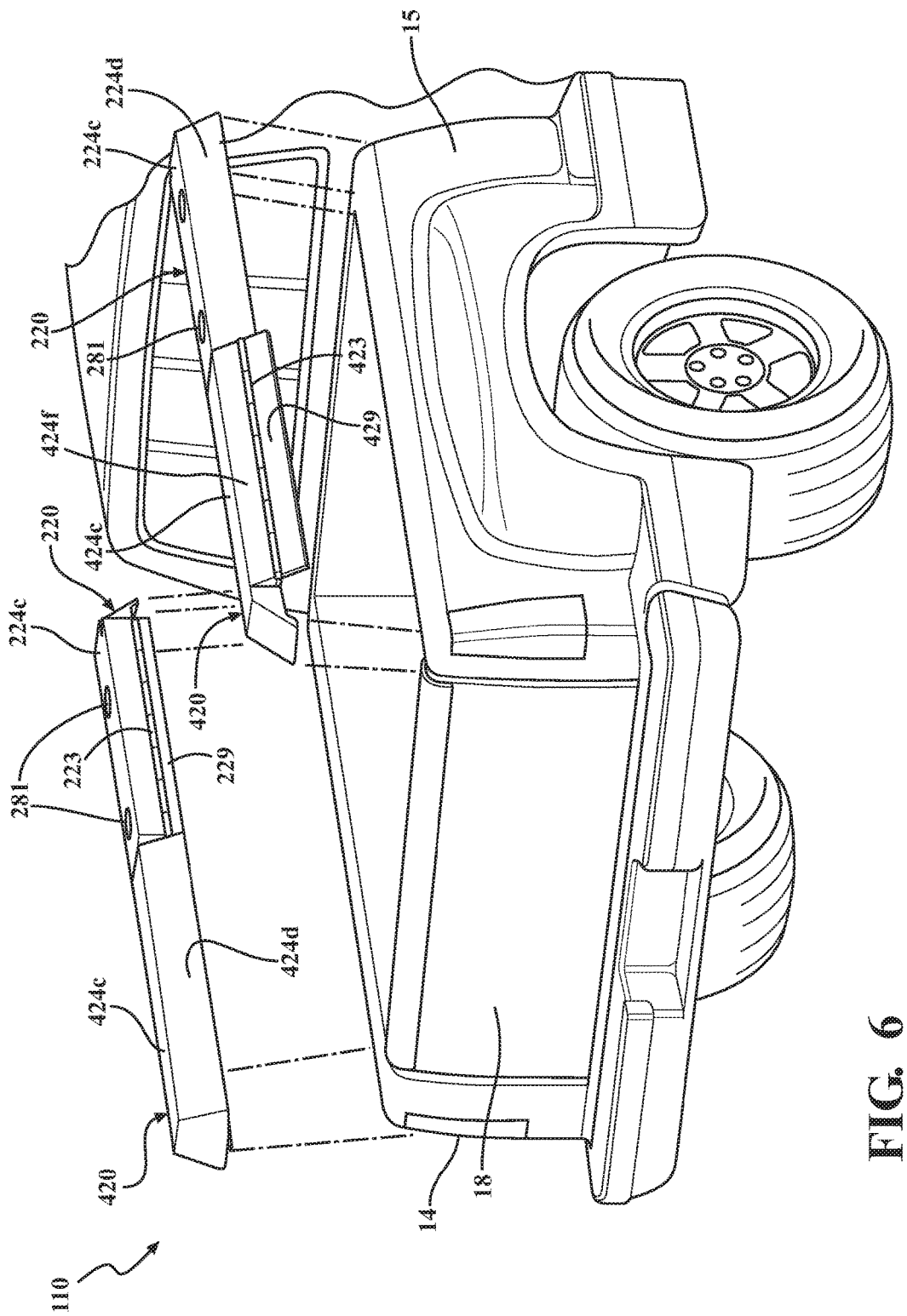
FIG. 6 is a schematic perspective view of a pickup truck incorporating protective coverings in accordance with multiple embodiments described herein, attached to the top portions of each cargo bed sidewall.

FIG. 6 is a schematic perspective exterior view of a pickup truck 110 incorporating protective coverings in accordance with multiple embodiments described herein, attached to top portions of cargo bed sidewalls 14 and 15. FIG. 6 illustrates an aspect wherein multiple different sections embodying different structures of the protective covering may be attached to a single sidewall or to the tailgate 18. In the example shown in FIG. 6, covering sections having the covering structure 420 shown in FIG. 5 may be attached to rear portions of the sidewalls 14 and 15, while covering sections having the structure of the embodiment 220 shown in FIG. 3 may be attached to forward portions of the sidewalls 14 and 15. This enables the rear covering sections with the structure 420 to serve as foldable seat structures which include seating surfaces on opposite sides of the cargo bed when the second portions 424 of the coverings 420 are rotated outwardly (in directions away from the cargo bed) to their respective second orientations. Also, the front covering sections with the structure of the embodiment 220 may provide drink holders 281 to users seated on the seating surfaces, or the front covering sections may provide flat table surfaces for food or other items when the covering second portions 224 of the coverings 220 are rotated inwardly (in directions toward the cargo bed) to their respective second orientations.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

In the preceding detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein. Accordingly, reference should be made to the following claims, rather than to the foregoing specification, as indicating the scope of the invention.

What is claimed is:

1. A covering for a wall of a vehicle cargo bed, the covering comprising:
    a first portion structured to be attached to a top portion of the wall, the first portion having a first surface;
    a second portion rotatably connected to the first portion, the second portion having a first surface, the second portion being rotatable between a first orientation in which the second portion first surface resides directly opposite the first portion first surface and faces in a first direction toward the first portion first surface, and a second orientation in which the second portion first surface faces in a second direction opposite the first direction; and
    a shoulder structured to extend upwardly from the second portion first surface when the second portion is in the second orientation and the first portion is attached to the wall.

2. The covering claim 1 wherein the second portion first surface is structured to be substantially coplanar with the first portion first surface when the second portion is in the second orientation.

3. The covering of claim 1 further comprising a shoulder extending from an edge of the first portion at an angle with respect to the first portion first surface.

4. The covering of claim 1 wherein the second portion first surface is flat, the first portion first surface is flat, and wherein the second portion first surface is structured to be substantially coplanar with the first portion first surface when the second portion is in the second orientation.

5. The covering of claim 1 wherein the second portion first surface is structured to be concave with respect to the first portion first surface when the second portion first surface faces toward the first portion first surface.

6. A covering for a wall of a vehicle cargo bed, the covering comprising:
    a first portion structured to be attached to a top portion of the wall, the first portion having a first surface;
    a second portion rotatably connected to the first portion, the second portion having a first surface, the second portion being rotatable between a first orientation in which the second portion first surface resides directly opposite the first portion first surface and faces in a first direction toward the first portion first surface, and a second orientation in which the second portion first surface faces in a second direction opposite the first direction; and
    a shoulder extending from an edge of the second portion at an angle with respect to the second portion first surface,
    wherein the shoulder extending from the second portion is structured to bear against an exterior surface of the wall when the second portion is in the first orientation and the covering first portion is attached to the top portion of the wall such that the covering second portion is rotatable in a direction toward the cargo bed to position the second portion in the second orientation.

7. A covering for a wall of a vehicle cargo bed, the covering comprising:
    a first portion structured to be attached to a top portion of the wall, the first portion having a first surface;
    a second portion rotatably connected to the first portion, the second portion having a first surface, the second portion being rotatable between a first orientation in which the second portion first surface resides directly opposite the first portion first surface and faces in a first direction toward the first portion first surface, and a second orientation in which the second portion first surface faces in a second direction opposite the first direction; and
    a shoulder extending from an edge of the second portion at an angle with respect to the second portion first surface;
    the covering further comprising a shoulder extending from an edge of the first portion at an angle with respect to the first portion first surface,
    wherein the shoulder extending from the first portion is structured to rest against the cargo bed wall when the shoulder extending from the first portion is positioned exterior of the cargo bed.

8. A covering for a wall of a vehicle cargo bed, the covering comprising:
    a first portion structured to be attached to a top portion of the wall, the first portion having a first surface;
    a second portion rotatably connected to the first portion, the second portion having a first surface, the second portion being rotatable between a first orientation in which the second portion first surface resides directly opposite the first portion first surface and faces in a first direction toward the first portion first surface, and a second orientation in which the second portion first surface faces in a second direction opposite the first direction; and
    a shoulder extending from an edge of the second portion at an angle with respect to the second portion first surface,
    the covering further comprising a shoulder extending from an edge of the first portion at an angle with respect to the first portion first surface,
    the covering further comprising a plurality of through holes formed in the first portion, a first portion of the plurality of through holes being structured for use in attaching the covering first portion to the wall such that the shoulder extending from the first portion extends toward an exterior of the cargo bed, a second portion of the plurality of through holes being structured for use in attaching the covering first portion to the wall such that the first portion shoulder extends toward an interior of the cargo bed.

9. A covering for a wall of a vehicle cargo bed, the covering comprising:
    a first portion structured to be attached to a top portion of the wall, the first portion having a first surface;
    a second portion rotatably connected to the first portion, the second portion having a first surface, the second portion being rotatable between a first orientation in which the second portion first surface resides directly opposite the first portion first surface and faces in a first direction toward the first portion first surface, and a second orientation in which the second portion first surface faces in a second direction opposite the first direction; and
    a shoulder extending from an edge of the second portion at an angle with respect to the second portion first surface,
    wherein the first portion includes a bearing surface, wherein the second portion includes a support structure deployable to engage the bearing surface when the second portion is in the second orientation, and wherein the support structure is structured to support the second portion when the support structure is engaged with the bearing surface.

10. The covering of claim 9 wherein the support structure is structured to deploy automatically during a rotation of the second portion to the second orientation.

11. The covering of claim 9 wherein the support structure comprises at least one support arm rotatably connected to the second portion.

12. The covering of claim 9 wherein the support structure comprises at least one longitudinal support wall rotatably connected to the second portion.

13. A covering for a wall of a vehicle cargo bed, the covering comprising:
 a first portion structured to be attached to a top portion of the wall, the first portion having a first surface;
 a second portion rotatably connected to the first portion, the second portion having a first surface, the second portion being rotatable between a first orientation in which the second portion first surface resides directly opposite the first portion first surface and faces in a first direction toward the first portion first surface, and a second orientation in which the second portion first surface faces in a second direction opposite the first direction; and
 a shoulder extending from an edge of the second portion at an angle with respect to the second portion first surface,
 and wherein the covering further comprises a retractable shoulder extension extendibly mounted in the covering second portion.

14. A foldable seat structure for a vehicle, the seat structure comprising:
 a first portion structured for mounting to a wall defining a portion of a cargo bed of the vehicle, the first portion defining a first portion first surface; and
 a second portion rotatably connected to the first portion, the second portion defining a second portion first surface, the second portion being rotatable between a first orientation in which the second portion first surface faces toward the first portion first surface, and a second orientation in which the second portion first surface is substantially coplanar with the first portion first surface,
 the first portion first surface and the second portion first surface being structured to form a seating surface when the first portion is mounted to the wall defining a portion of a cargo bed and the second portion is in the second orientation,
 wherein the second portion includes a tactile backstop structured to extend in an upward direction from the second portion first surface when the seat structure is mounted to the wall defining a portion of the cargo bed and the second portion is in the second orientation.

15. The foldable seat structure of claim 14 further comprising a retractable shoulder extension mounted in the seat structure second portion so as to be extendible from the tactile backstop in an upward direction when the second portion is in the second orientation and the seat structure is mounted to the wall defining a portion of the cargo bed.

16. The foldable seat structure of claim 14 further comprising a shoulder extending from an edge of the first portion, and wherein the second portion is structured to abut the shoulder extending from the first portion when the second portion is in the second orientation.

17. A vehicle including at least one wall defining a portion of a cargo bed and a plurality of coverings mounted on a top portion of the at least one wall, each covering of the plurality of coverings having a first portion mounted to the at least one wall and a second portion rotatably connected to the first portion, a first covering of the plurality of coverings having a first structure, a second covering of the plurality of coverings being mounted adjacent the first covering, the second covering of the plurality of coverings having a second structure different from the first structure.

18. The vehicle of claim 17 wherein one of the first covering and the second covering of the plurality of coverings comprises a foldable seat structure.

\* \* \* \* \*

UNITED STATES PATENT AND TRADEMARK OFFICE
CERTIFICATE OF CORRECTION

Page 1 of 1

PATENT NO. : 10,071,775 B1
APPLICATION NO. : 15/498537
DATED : September 11, 2018
INVENTOR(S) : Scott Frederick et al.

It is certified that error appears in the above-identified patent and that said Letters Patent is hereby corrected as shown below:

In the Specification

Column 7, Line 16: delete "51" and insert --S1--

Column 7, Line 23: delete "51" and insert --S1--

Column 8, Line 42: delete "51" and insert --S1--

Column 8, Line 48: delete "51" and insert --S1--

Signed and Sealed this
Twelfth Day of November, 2019

Andrei Iancu
*Director of the United States Patent and Trademark Office*